ERROR CORRECTING TAPE TELECOMMUNICATION SYSTEM
Filed Jan. 10, 1963 5 Sheets-Sheet 1
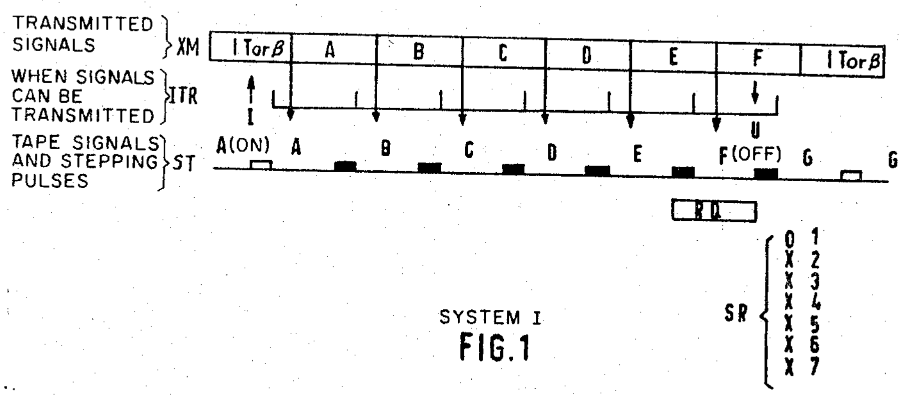
FIG.1
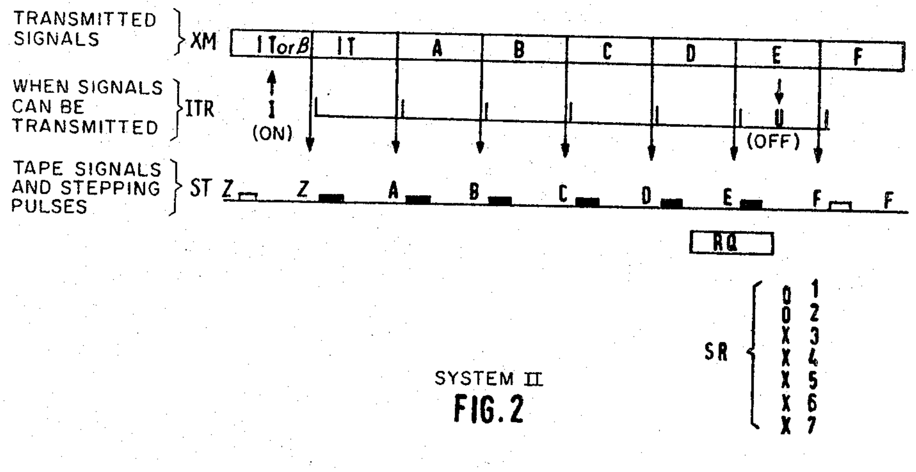
FIG.2
| | SR 1 | ITR | Ret |
|---|---|---|---|
| (2) | 0 | X | +1 |
| (7) | 0 | X | +1 |
| (3) | X | 0 | -1 |
| (5) | X | 0 | -1 |
| (1) | X | X | 0 |
| (4) | 0 | 0 | 0 |
| (6) | X | X | 0 |
| (8) | 0 | 0 | 0 |
FIG.5
INVENTOR.
HERMAN da SILVA
BY
Hugh A. Kirk
ATT'Y.

INVENTOR.
HERMAN da SILVA
BY
[signature]
ATT'Y.

May 2, 1967 H. DA SILVA 3,317,667

ERROR CORRECTING TAPE TELECOMMUNICATION SYSTEM

Filed Jan. 10, 1963 5 Sheets-Sheet 3

INVENTOR.
HERMAN da SILVA
BY Hugh A. Kirk
ATT'Y.

May 2, 1967 H. DA SILVA 3,317,667

ERROR CORRECTING TAPE TELECOMMUNICATION SYSTEM

Filed Jan. 10, 1963 5 Sheets-Sheet 4

INVENTOR.
HERMAN da SILVA

BY Hugh A Kirk
ATT'Y.

INVENTOR.
HERMAN DA SILVA
BY Hugh A. Kirk
ATTORNEY

United States Patent Office 3,317,667
Patented May 2, 1967

3,317,667
ERROR CORRECTING TAPE TELECOMMUNICATION SYSTEM
Herman da Silva, Voorburg, Netherlands, assignor to de Staat der Nederlanden, ten deze vertegenwoordigd door de Directeur-Generaal der Posterijen, Telegrafie en Telefonie
Filed Jan. 10, 1963, Ser. No. 250,577
Claims priority, application Netherlands, Jan. 18, 1962, 273,728
9 Claims. (Cl. 178—23)

ABSTRACT OF THE DISCLOSURE

The invention relates to a telegraph system with error correction by means of repetition cycles of predetermined duration and more particularly such a system provided with a tape transmitter, in which the tape is used as a memory.

Figure 3:
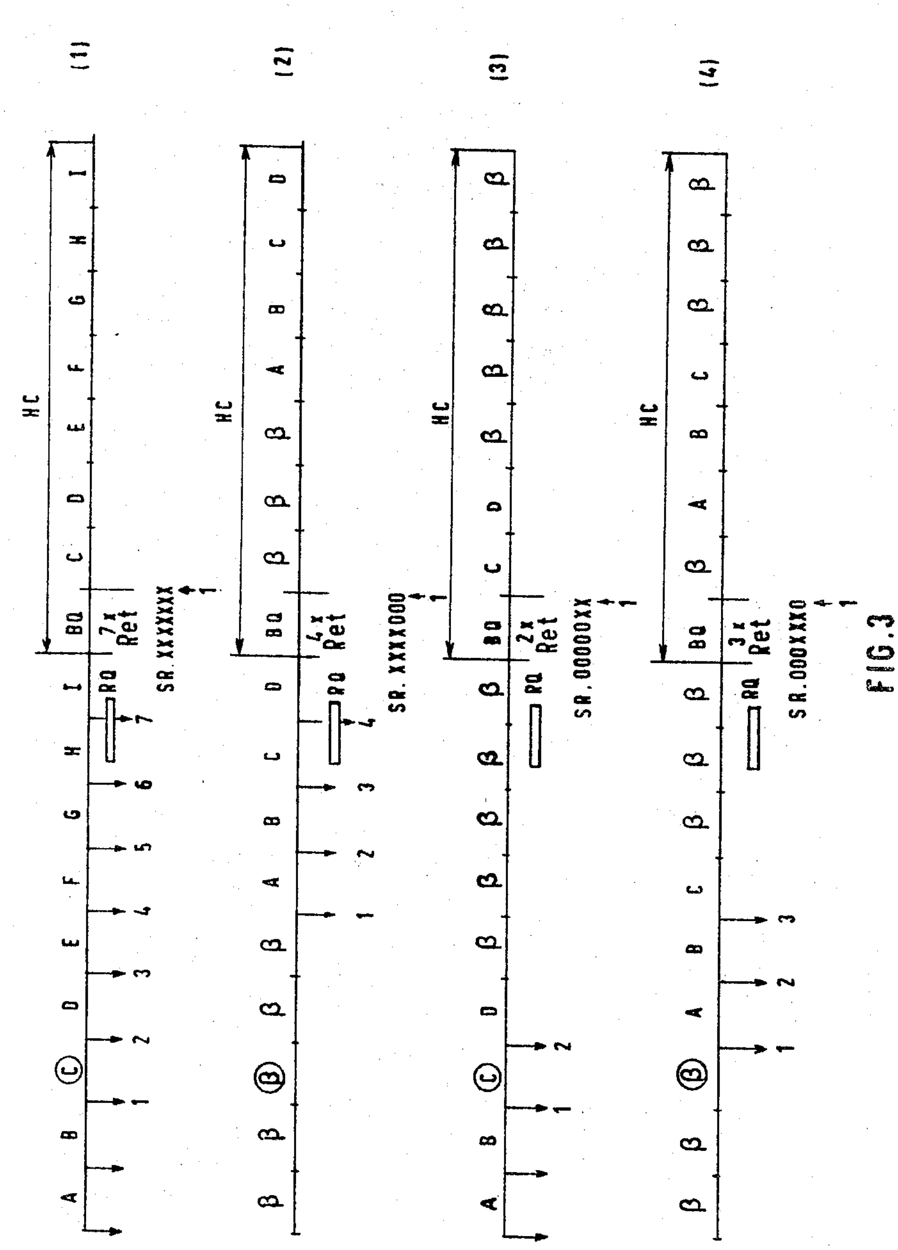

Furthermore this invention relates to a system for detecting the presence and location of idle time signals in a repetition cycle, and then only stepping the tape back for those signals in the repetition cycle which have been transmitted from the tape, regardless of how many idle time signals may have been interspersed between, before, and/or after the signals from the tape.

BACKGROUND OF INVENTION

A method involving the switching of the tape transmitter is known from the German patent specification No. 880,314. A difficulty with this method resides in the fact that a repetition cycle is required each time the tape transmitter is switched on and off. This is done in order to ensure the correct impression in the event that a repetition occurs during the switching-on and off. For such systems having a short repetition cycle, e.g. those having three signals in the memory, this means that the tape needs only to be set back three symbols. If, however, a longer repetition cycle is used, the number of symbols by which the tape is to be set back in the case of a repetition increases accordingly, such as if a repetition cycle of eight signals is used, the tape then must be set back eight signals both when the tape transmitter is swittched off as well as on. Thus when the transmitter is switched on, the tape must at least be placed in the reader at the eighth symbol, so that the tape transport wheel can impart seven backward steps to the tape. This, however, requires both a special adaptation of the message in the tape and a certain degree of attentiveness in laying the tape in the reader. Moreover, every switching-on and switching-off of the transmitter is attended with loss of time caused by this required repetition period.

DESCRIPTION OF INVENTION

(A) *Objects and advantages*

It is the object of this invention to overcome these difficulties.

Another object is to substitute for the repetition procedure at the switching-on and switching-off of the tape transmitter, another method to safeguard the correct impression in the case of repetitions during the switching-in and switching-out periods.

Another object is to establish a number of forward steps imparted to the tape during the last $n$ rotations (one rotation=one multi-element code signal) performed before the start of a repetition cycle in the system, which $n$ signals are stored in the memory.

Still another object is to impart to the tape this fixed number of steps in an opposite direction during the interval when the BQ signal (i.e., the first signal announcing the repetition in every repetition cycle) is transmitted so that the first symbol to be repeated can be placed right in front of the reading mechanism.

A study of the well-known automatic repetition systems shows that the pattern of a repetition cycle, being the transmission of signals as a result of the reception of the request for repetition or RQ-signal, must be similar to the pattern of the original transmission, though preceded by a BQ-signal. By establishing the number of forward steps taken by the transmitter tape, the number of backward steps to be imparted to reposition the tape for retransmission of the correct number of signals has become known, but the order or distribution of transmission in a repetition cycle is not determined by it. As far as retransmission of signals only from the tape is concerned, the order of perforation determines the order of transmission. If, however, the signals transmitted are partly tape signals and partly idle time or pause signals generated by the transmitter itself, the distribution or order of sequence is not fixed anywhere.

For example, if a repetition occurs, when four steps, units, or rotations, have been taken (or signals sent) after the tape transmitter has been switched on, the original transmission of a seven unit repetition cycle will look as follows:

pause–pause–pause–A–B–C–D (1)

If, however, the pause signals are transmitted after the tape transmitter has been switched off, the order of transmission of the four signals in the last seven steps will be as follows:

A–B–C–D–pause–pause–pause (2)

Another possibility consists in a combination of switching-on and switching-off, the transmitting pattern looking as follows:

A–pause–B–pause–C–pause–D (3)

In all these three cases it has been established that the number of backward steps amounts to four, but the order of transmission distribution in a repetition cycle is always different. In order that the correct distribution or order of transmission of the traffic signals in the repetition can be obtained, according to this invention, a shift register has been added to the system. This register stores as many bits as there are signals which must remain stored in the momery for a repetition cycle, which in the given example is seven bits.

If a pause signal is transmitted, an 0 condition is applied to this register, whereas in the case of the transmission of other tape message signals or of BQ signals, an X condition is applied to the shift register. Then the 0/X configuration of the shift register is representative of the order or distribution of transmission signals in the memory at the moment when a repetition is to be made.

At the same time the number of X-bits in the register indicates the number of steps or signals performed, and in the case of a repetition, a like number of backward steps is then correspondingly imparted to the tape.

At the same time the number of X-bits in the register indicates the number of transport steps performed and, in the case of a repetition, a like number of backward steps must be imparted to the tape.

(B) *Brief description of the figures:*

Figure 4A:
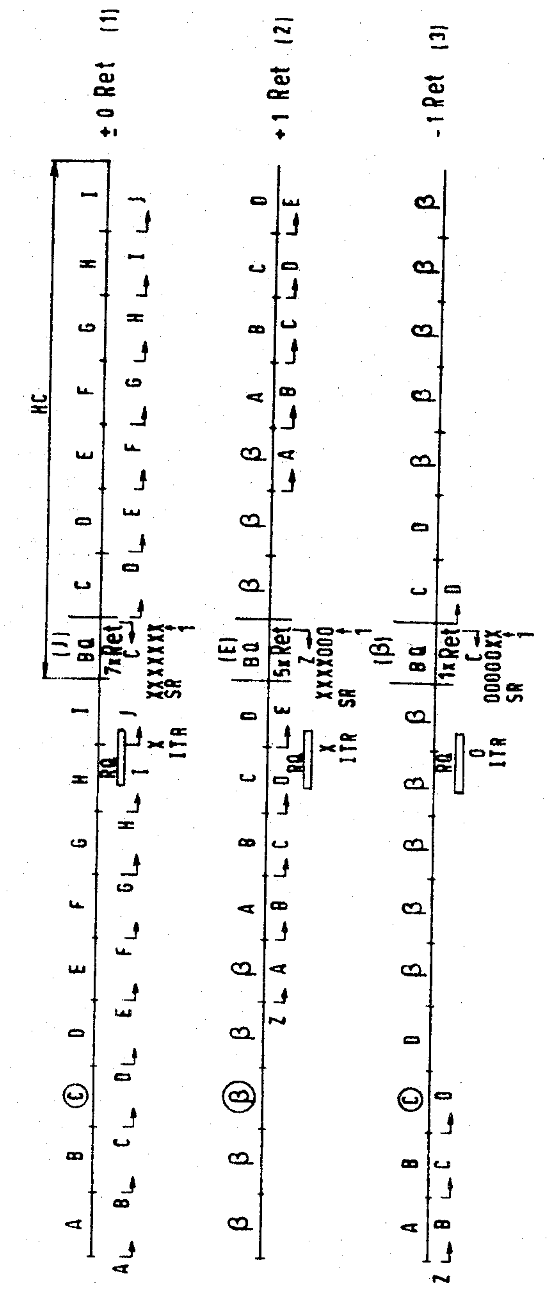
Figure 4B:
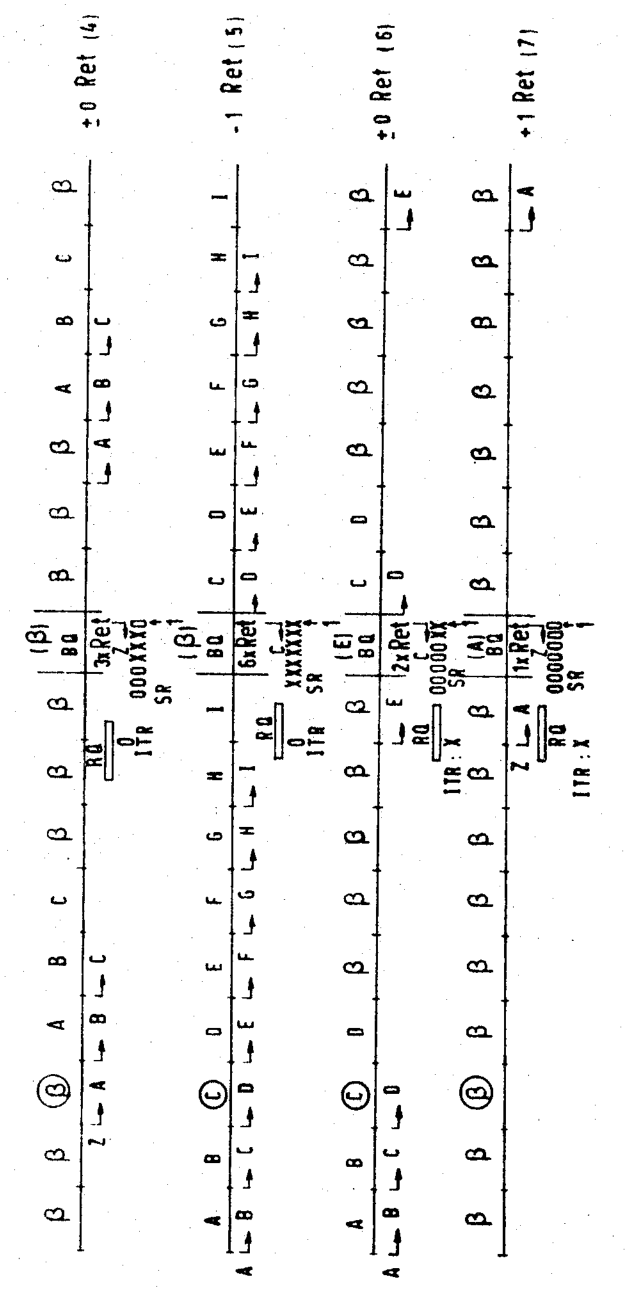
Figure 6:
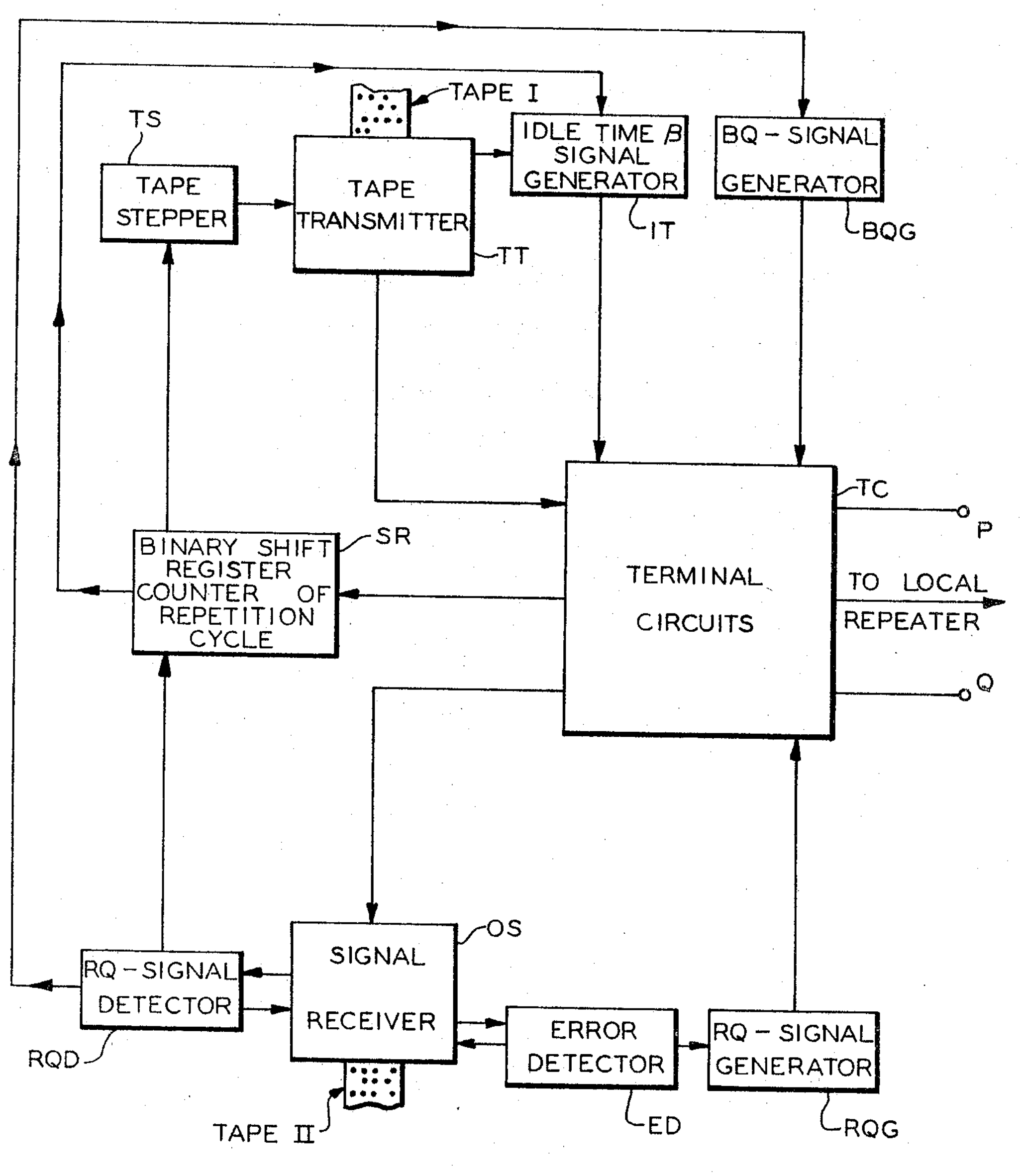

The above mentioned and other features and objects of this invention and the manner of attaining them will become more apparent and the invention itself will be understood best by reference to the following description of embodiments of the invention taken in conjunction with the accompanying drawings, wherein:

FIGS. 1 and 2 are schematic time diagrams illustrating the two different sequences of tape reading and signal transmission for systems adaptable to the present invention;

FIGS. 3 and 4*a*–4*b* are schematic time diagrams illustrating various cases which may arise in the application of the invention in the systems of FIGS. 1 and 2, respectively;

FIG. 5 is a table illustrating the method employed in the seven cases shown in FIGS. 4*a*–4*b*; and FIG. 6 is a schematic block wiring diagram of the association of the circuits of this invention with a telegraph terminal circuit.

(C) *Detailed description*

In the well-known telegraph systems with automatic error correction, two systems regarding the tape transport and signal transmission relation can be applied.

*System I*

The first of these systems operates as follows:

When the tape transmitter is switched on, the symbol in the reading-station is transmitted as first signal from the tape. When the tape transmitter is switched off, however, the last symbol stored in the reading-station is not transmitted. This happens because in this system after the switching-on the signal transmission occurs first, and then the transport is effected. This will be explained with the aid of the time diagram of FIG. 1.

In FIG. 1 the line XM represents the transmission of the signals at successive transmitter rotations. The line ITR shows when the result of the test for signal transmission (from the tape, for other than a pause signal) indicates an "active" condition. This "active" condition depends on whether the tape transmitter has been switched on or not and the indication occurs at defined moments in the transmitter rotation. The moments when ITR can indicate "active" condition and "inactive" condition again, are marked by vertical strokes. It is supposed that the tape transmitter is switched on at the moment marked I, at the first short upward arrow at the left. When a rotation (a transmitting period) begins, ITR being active, a signal "A" (in this instance in FIG. 1) is read at the reading-station (line ST) of the tape transmitter and transmitter (line XM), i.e. at the time of the first signal testing moment indicated by the long downwardly pointing vertical arrows between XM and ST.

In FIGS. 1 and 2 the transport steps or pulses actually occurring are represented by black rectangles, the suppressed steps being represented by white rectangles.

The tape transport pulses on line ST may also occur at defined moments in the rotation, notably just before the activating-moments and de-activating-moments or before the indicating moments of ITR. Thus the letter "A" proves to be transmitted as the first tape signal and the letter "F" as the last tape signal, the transmitter being supposed to be switched off at the moment marked U, at the last short downward arrow at the right.

Before the switching-on, the letter "A" lies in the reading-station (see line ST), whereas after the switching-off the letter "G" can be found in it. Thus, the first symbol is transmitted and the last is not transmitted.

It is also clear that in the first system, in which each transport step always entails the transmission of a signal from the tape, the number of X-bits of the shift register SR always agrees with the number of transport steps performed.

The four cases of FIG. 3 demonstrate this further. In this figure the signal entailing the request for repetition is placed in a circle. The pause transmissions are designated by the symbol for beta ($\beta$), the numbered arrows representing the transport steps.

*System II*

The second system (see FIG. 2) relates to the following:

When the tape transmitter is switched on, the symbol ("Z") present in the reading-station is moved on and the fresh symbol ("A") introduced is transmitted as first signal. On the other hand the last symbol ("F") introduced into the reading-station is transmitted. This happens, as will appear from FIG. 2, because in this system, when the tape transmitter is switched in, the tape transport takes place first, and then the signal transmission is effected. The moments when the ITR test can become active occur just after the beginning of a transmission period, that is, when the signal in the tape transmitter has already been read out. The transport step takes place immediately after the moment when the ITR indication has appeared as active or inactive, on the understanding that after ITR has become inactive, no further transport step occurs (see white pulses on line ST in FIG. 2).

When at the moment marked I in FIG. 2 the tape transmitter is switched on, the transmission period immediately following this moment will be used to transmit another pause signal "IT" or B (line XM), since the first or next transmission period begins just before the ITR indicates it has become active due to the switching-on. The step, which does take place immediately after ITR has become active, moves the symbol "Z" out of the reading-station (ST), the symbol "A" being introduced.

Then the symbols "A," "B," "C" etc. are successively transmitted. If the tape transmitter is switched off at the moment U, the symbol "F" will still be transmitted in the next transmitting period after U, because at the signal testing moment (long vertical downwardly pointing arrows) the ITR criterion is still active, but becomes inactive immediately afterwards. In consequence of this, no step is effected so that the letter "F" already transmitted remains in the reading-station on tape ST.

It can be seen from FIG. 2 that the symbol "A" is transmitted as first tape signal and the symbol "F" as last tape signal. Before the switching-on, however, the symbol "Z" was in the reading-station, and after the switching-off the symbol "F" is still in the reading station.

It is clear that in the case of the second system, the number of steps does not always agree with the number of symbols transmitted from the tape. If in the example of FIG. 2, the first pause signal "IT" or B is received mutilated at the counter-station, and the RQ-signal consequenly transmitted by the counter-station is received during the transmission of the symbol "E," the 0/X configuration of the shift register SR would be as shown in the said figure. Five X-bits are found in it, whereas six transport steps have been performed.

*Shift register SR*

This second system is mostly applied in practice, so that the invention indicates further methods to obtain the correct number of return steps.

With the help of the seven cases illustrated in the FIGS. 4*a* and 4*b* which may occur in the second system, it will now be explained what supplementary methods are applied.

In the FIGURES 4*a* and 4*b* the figures entailing the request for repetition have been placed in a circle. The pause transmissions are indicated by the symbol for beta ($\beta$). The repetition cycle always occurs between the two vertical lines separating eight signal rotations and connected by the bidirectional arrow line and is designated by HC (FIG. 4*a* at top).

The symbol placed in parentheses above the BQ designation shows which signal would have been transmitted, if *no* repetition had occurred.

The tape transport steps are indicated by an arrow bending to the right and the symbol placed at the right of such an arrow shows what tape signal is in the reading-station after that step.

At the moments marked by these arrows, the ITR indication or criterion is active; at moments not marked by arrows, the ITR indication or criterion is inactive. It must be observed that the signal testing moments, at the beginning of the transmitting period, lie just before the moment when the ITR criterion can become active (see FIG. 2). Thus these testing moments lie before the transport steps marked by arrows. The contents of the shift register SR, as it is during the reception of an "RQ" signal, are representative of the transmitting sequence of the pause and tape signals during the repetition cycle after the transmission of the "BQ" signal.

The reference 7*x* Ret, 5*x* Ret, etc. placed below each "BQ" transmission and the arrow bending to the left indicates the necessary number of return steps. The symbol placed at the left of such an arrow indicates which symbol is in the reading-station after the required return steps.

A consideration of the seven cases teaches that in case (1) the number of return steps to be performed corresponds to the number of X-bits in the shift register SR. In this case no return steps need to be added nor eliminated (±0 Ret).

In the second case (2) five return steps prove to be necessary, whereas the shift register SR only indicates four X-bits. So an additional return step must be added (+1 Ret).

Thus there are the following cases (in FIG. 4):

(1) 7 Ret required; SR indicates 7 X-bits (0 Ret)
(2) 5 Ret required; SR indicates 4 X-bits (+1 Ret)
(3) 1 Ret required; SR indicates 2 X-bits (−1 Ret) ("$\beta$" over "BQ")
(4) 3 Ret required; SR indicates 3 X-bits (0 Ret)
(5) 6 Ret required; SR indicates 7 X-bits (−1 Ret) ("$\beta$" over "BQ")
(6) 2 Ret required; SR indicates 2 X-bits (0 Ret)
(7) 1 Ret required; SR indicates 0 X-bits (+1 Ret)

An eighth case may be mentioned still, notably the state of continual pause signals. In this case the shift register is always in the state 0000000, but no transport steps occur. Thus the eighth case might be stated as follows:

(8) 0 Ret required; SR indicates 0 X-bits (0 Ret).

With the help of the tabulation of FIG. 5 it can be established that the cases (2) (FIG. 5) and (7) require one additional return step, the shift register element marked 1 contains the bit 0 by the symbol $\beta$, and the ITR indication or criterion is active at the moment when a repetition turns out to be necessary, which is indicated by X in FIG. 5. Thus where one additional return step is required the 0–X condition of the shift register element 1 and the ITR indication serves to shown this.

The cases (3) and (5) require one return step less than the shift register contains X-bits, the shift register element marked 1 containing the X-bit. At the said moment the ITR indication or criterion is inactive, which is indicated by 0 in FIG. 5. Thus where one less return step is required the X–0 condition of the shift register element 1 and the ITR indication serves to shown this.

The cases (1), (4), (6) and (8) require as many return steps as there are X-bits in the shift register, the SR1–ITR combination always being X—X or 0—0, which indicates that no additional return steps have to be added or subtracted.

For the purpose of deriving the number of return steps from the shift register configuration, the register is quickly driven around by means of pulses in the BQ transmitting period, and the bit information thus extracted from it is introduced to it again, so that after seven pulses the shift register exhibits the original configuration. Each X-bit extracted entails one forward step of the tape.

The cases (1), (4), (6) and (8) of the FIGURES 4*a* and 4*b* are confined to this.

In the cases (2) and (7) one more backward step is made after the shift register cycle, the criterion for this step being found in the 0–X conditions of SR1 and ITR (FIG. 5).

In the cases (3) and (5) one forward step is performed after the shift register cycle, because it is more cumbersome to suppress one backward step (since such steps do not appear at defined moments) than to carry out the number of backward steps indicated by the shift register and then to perform one correcting forward step. This criterion is found in the X–0 condition of SR–ITR.

Another method of determining the number of return steps in a system as mentioned in the second place consists in counting the number of transport steps by means of an additional shift register or counting device. In this case this counting device must have seven stages providing eight criteria, viz 0, 1, 2, 3, 4, 5, 6 and 7. When switched on this counter is put in the 0-criterion state and counts every transport step performed. When the counter has reached the final state (state 7), further steps are ignored. Each rotation in which there occurs no transport step, causes the counter to record in a backward direction, so to count back. When the counter is back in the initial state (state 0), further transport steps not occurring are ignored. The state of this counter at the beginning of a repetition cycle then determines the number of return steps to be performed.

This method, however, is more expensive and more cumbersome, because the shift register must be maintained anyhow to ensure the correct transmitting sequence.

*Operation*

Referring now to FIG. 6 there is shown a block wiring diagram of the circuits which may perform the functions described above in the sections headed Systems I and II and the Shift Register SR. These circuits for a tape transmitting telegraph system comprise primarily the terminal circuits TC which are connected to the two line points P and Q on the conductors to the local repeater. When the circuit is operated for transmitting traffic signals from the Tape I, these Tape I traffic signals are read one by one from the tape in the tape transmitter TT and conducted to the terminal circuit TC, which comprises the necessary transmission contacts and relays controlled by the tape transmitter, to give the necessary pulses to the conductor points P and C. These multi-element traffic signals as they are transmitted are also recorded and counted by bits in the binary shift register counter of the repetition cycle SR connected to the terminal circuits TC, so that each traffic signal from the tape I, as it is transmitted, produces an X-bit as above described and shown in FIGS. 3, 4*a*–4*b* and 5.

Connected to the tape transmitter is a tape stepping means TS which may be stepped forwardly and backwardly under the control of the binary shift register SR corresponding to the number of X-bits which have been recorded in this shift register counter SR for each previous seven signals, if seven is the number in the repetition cycle as for the systems described above. Thus by stepping the Tape I backward, this tape also acts as a memory for the traffic signals which have just been transmitted during the repetition cycle period, and a separate memory circuit for these traffic signals is therefore not required in this system.

There is also provided an idle time beta ($\beta$) signal generator IT which is connected also to the terminal circuits TC for operating the transmitter contacts, and may be controlled by the tape transmitter TT as well as the binary shift register counter SR, so that any time the tape transmitter TT does not transmit signals, idle time signals ($\beta$) will be generated automatically and transmitted at that station to maintain the synchronism of the circuit from the elements in each signal. The control of these idle time signal $\beta$ by the shift register SR would be under a shift register counter therein which counts the 0-bits according to the pattern they were transmitted during the previous repetition cycle of seven signals when a repetition is requested.

Still further there is connected a "BQ" signal generator BQG to the internal circuits TC, which generator BQG is under the control of the "RQ" signal or request for repetition signal detector RQD, when a signal is sent back from a remote station that an error has occurred. This "BQ" signal is generated and transmitted to the remote station as the first signal of each repetition cycle, to indicate to the remote station that the signals which follow in the repetition cycle are being repeated, and that those which have already been correctly received should be ignored.

Also when the station is a receiving station there is provided a signal receiver OS connected to the terminal circuit TC from which the properly and correctly received signals may be placed on a Tape II. Connected to the signal receiver is the error detector ED. Errors may be detected easily in multi-element signals if these signals are converted into a multi-element balanced code and the elements are then counted to see if they are in the proper balance. Thus the error detector circuit ED, associated with each signal receiver OS, tests the balanced code of each received signal, before it is converted into the code for placing on the Tape II.

In the event that an error is detected, the error detector circuit ED operates the RQ signal generator circuit RQG which generates a special signal for transmission back to the remote sending station, such as by applying a higher or different potential to one of the points P and/or Q from the terminal circuit TC, to indicate to the remote station that repetition is required. At the same time the erroneous signal is detected, the error detector circuit ED blocks the Tape II for the repetition cycle number of signals.

As previously mentioned when an "RQ" signal is received at a station, it is not printed on the Tape II by the signal receiver OS, but it controls the RQ signal detector RQD which in turn operates the binary shift register counter SR to start the repetition cycle at that station also and at the same time operates the BQ signal generator BQG for sending back the first signal of the repetition cycle to indicate at the remote station that the request for repetition has been received correctly. However, this "BQ" signal when received is blocked from the tape as occurring during the repetition cycle at its receiving station.

It is also important that if the traffic signals from the Tape I are transmitted interspersed with idle time signals $\beta$ in a specific pattern, that these signals be retransmitted in this pattern, under the control of the binary shift register SR, particularly for propagation times shorter than the length of time for completing the repetition cycle. Thus if idle time signals $\beta$ and message or traffic signals alternately occur throughout a repetition cycle, or if the message signals occur at the first part of the repetition cycle followed by idle time signals $\beta$ and their patterns are not maintained on repetition or retransmission, an overlap may cancel out one or more of these signals, or there might be a repetition of unwarranted signals.

While I have illustrated and described what I regard to be the preferred embodiment of my invention, nevertheless it will be understood that such is merely exemplary and that numerous modifications and rearrangements may be made therein, without departing from the essence of the invention.

What is claimed is:

1. A telecommunication system of multi-element traffic signals for a tape and having an automatic error correction device provided with a predetermined number of signals in a repetition cycle, said system comprising:

(A) means (TS) for stepping said tape forwardly and backwardly so that it can act as a memory for said traffic signals, (B) means (TT) for transmitting said traffic signals (A, B, C,) from said tape, (C) means (IT) for transmitting idle time signals ($\beta$) when said traffic signals are not being transmitted from said tape, and (D) a shift register means (SR) for counting the number of traffic signals and idle time signals transmitted in sequence for said number of signals in said repetition cycle, and controlling said stepping means to back-step said tape only that number of steps (X) in said counting means corresponding to transmitted traffic signals, when a request for repetition is made by said error correction device for retransmission of said traffic signals stored on said tape.

2. A system according to claim 1 wherein said shift register means comprises a binary counter for separately counting traffic (X) and idle time signals (0) and recording the pattern in which they were sent during the previous said number of signals in said repetition cycle.

3. A system according to claim 1 wherein said tape transmitter reads the traffic signals from said tape after the tape transmitter has been switched on before stepping said tape (System I).

4. A system according to claim 1 wherein said tape transmitter steps said tape after said tape transmitter has been switched on before it reads the traffic signals (System II).

5. A system according to claim 4 wherein said shift register adds a back step to said tape when the first signal in said shift register is an idle time signal.

6. A system according to claim 4 wherein said shift register adds a forward step to said tape when the first signal in said shift register is a traffic signal.

7. A system according to claim 1 wherein said shift register includes a counting means for counting one more than the number of signals in said repetition cycle, which said counting means adds the number of traffic signals sequentially transmitted up to the number of signals in the repetition cycle and stops, and diminishes by the number of idle time signals up to the number of signals in the repetition cycle and then stops.

8. A telecommunication system for multi-element code signals between two stations, comprising:

(A) tape means (TAPE I) recording traffic signals at one station, (B) means (TS) for stepping said tape means forwardly and backwardly whereby said tape means also acts as a memory for said traffic signals, (C) means (TT) for transmitting traffic signals from said tape means, (D) means (IT) at one station for transmitting the idle time signals when said traffic signals are not being transmitted from said tape means, (E) means (OS) at another station for receiving said signals, (F) means (TAPE II) for recording the said traffic signals correctly received by said receiving means, (G) means (ED) for detecting errors in each signal received by said receiving means, (H) means (RQG) at said other station for transmitting a request for repetition signal (RQ) to said one station when an erroneous signal has been detected by said detecting means, (I) means (ED, OS) at said other station for starting a blocking cycle of $n$ signals to block the recording of the next $n$ signal received, when an erroneous signal has been detected, (J) means (RDQ) at said one station for receiving said request for repetition signal (RQ), (K) means (BQR) responsive to the receipt of said request for repetition signal to start a repetition cycle of $n$ signals and transmit as the first signal of said cycle an answer-back signal (BQ) that said repetition is following, and (L) shift register means (SR) at said one station for counting each signal transmitted in sequence for $n$ signals and distinguishing said traffic signals (X) from said idle time signals (0) in their transmitted order for controlling said tape stepping means whereby said tape is stepped back only sufficient signal steps to retransmit therefrom those traffic signals which were transmitted during the prior *n* transmitted signals, and doing said stepping back of the tape during the transmission of said answer-back signal (BQ).

9. A system according to claim 8 wherein said shift register also controls the retransmitting of said traffic signals and idle time signals in said repetition cycle in the same sequential pattern as they were originally transmitted.

References Cited by the Examiner

UNITED STATES PATENTS

| | | | |
|---|---|---|---|
| 2,944,248 | 7/1960 | Auerbach et al. | 178—23.1 |
| 2,965,124 | 10/1960 | Hagelbarger | 178—23.1 |
| 3,038,961 | 6/1962 | Walker et al. | 178—23.1 |

NEIL C. READ, *Primary Examiner.*

T. A. ROBINSON, *Assistant Examiner.*